US011996250B2

(12) United States Patent
Dittmann et al.

(10) Patent No.: US 11,996,250 B2
(45) Date of Patent: May 28, 2024

(54) SWITCH ASSEMBLY WITH DRIVE SYSTEM, AND METHOD FOR SAFELY OPERATING A SWITCH ASSEMBLY

(71) Applicant: Maschinenfabrik Reinhausen GmbH, Regensburg (DE)

(72) Inventors: Benjamin Dittmann, Neutraubling (DE); Eduard Zerr, Regensburg (DE); Klaus Ixmeier, Thumhausen (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 275 days.

(21) Appl. No.: 17/608,165

(22) PCT Filed: Apr. 23, 2020

(86) PCT No.: PCT/EP2020/061278
§ 371 (c)(1),
(2) Date: Nov. 2, 2021

(87) PCT Pub. No.: WO2020/229121
PCT Pub. Date: Nov. 19, 2020

(65) Prior Publication Data

US 2022/0216013 A1 Jul. 7, 2022

(30) Foreign Application Priority Data

May 15, 2019 (DE) ..................... 10 2019 112 712.2

(51) Int. Cl.
*H01H 3/26* (2006.01)

(52) U.S. Cl.
CPC ......... *H01H 3/26* (2013.01); *H01H 2003/266* (2013.01)

(58) Field of Classification Search
CPC ............... H01H 3/26; H01H 2003/266; H01H 2009/0061; H01H 9/0027; H01H 3/22; H01H 9/26; H01H 9/0066
See application file for complete search history.

(56) References Cited

U.S. PATENT DOCUMENTS

| | | | | |
|---|---|---|---|---|
| 9,143,072 | B2 * | 9/2015 | Teising | H01H 33/6661 |
| 9,697,962 | B2 * | 7/2017 | Teising | H01H 3/30 |
| 10,840,033 | B2 * | 11/2020 | Teising | H01H 3/54 |

FOREIGN PATENT DOCUMENTS

| | | | |
|---|---|---|---|
| CN | 106783289 | A | 5/2017 |
| EP | 2691967 | A1 | 2/2014 |
| GB | 493648 | A | 10/1938 |
| WO | WO 2012135209 | A1 | 10/2012 |
| WO | WO 2018171175 | A1 | 9/2018 |

* cited by examiner

*Primary Examiner* — Edwin A. Leon
(74) *Attorney, Agent, or Firm* — LEYDIG VOIT & MAYERLTD.

(57) ABSTRACT

A switch assembly has a switch; and a servo drive system for the switch. The servo drive system includes: a motor configured to drive the switch; a power section configured to supply power to the motor; and a control unit configured to control the power section depending on at least one desired value. The control unit is configured to identify the presence of at least one safety-relevant event and, in the case of the safety-relevant event, to transmit at least one control signal to the power section. The power section is configured to initiate or carry out at least one safety measure depending on the control signal.

16 Claims, 2 Drawing Sheets

SWITCH ASSEMBLY WITH DRIVE SYSTEM, AND METHOD FOR SAFELY OPERATING A SWITCH ASSEMBLY

CROSS REFERENCE TO RELATED APPLICATIONS

This application is a U.S. National Phase application under 35 U.S.C. § 371 of International Application No. PCT/EP2020/061278, filed on Apr. 23, 2020, and claims benefit to German Patent Application No. DE 10 2019 112 712.2, filed on May 15, 2019. The International Application was published in German on Nov. 19, 2020, as WO 2020/229121 A1 under PCT Article 21(2).

FIELD

The invention relates to a switch assembly comprising a switch and a drive system for the switch and to a method for safely operating the switch assembly.

BACKGROUND

In substations, there are a large number of switches for different tasks and with different requirements. To operate the various switches, they must be driven via a drive system. These switches include, amongst others, on-load tap-changers, diverter switches, selectors, double reversing change-over selectors, reversing change-over selectors, change-over selectors, circuit breakers, on-load switches, or disconnecting switches.

For example, on-load tap-changers are used for uninterrupted switchover between different winding taps of an item of electrical equipment, such as a power transformer or a controllable reactor. For example, this makes it possible for the transmission ratio of the transformer or the inductance of the reactor to be changed. Double reversing change-over selectors are used to reverse the polarity of windings during power transformer operation.

All of these switches represent a highly safety-relevant component of the electrical equipment, because the switchover takes place while the equipment is in operation and is accordingly connected to a power network, for example. In extreme cases, malfunctions during operation can have serious technical and economic consequences.

SUMMARY

In an embodiment, the present disclosure provides a switch assembly that has a switch; and a servo drive system for the switch. The servo drive system includes: a motor configured to drive the switch; a power section configured to supply power to the motor; and a control unit configured to control the power section depending on at least one desired value. The control unit is configured to identify the presence of at least one safety-relevant event and, in the case of the safety-relevant event, to transmit at least one control signal to the power section. The power section is configured to initiate or carry out at least one safety measure depending on the control signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
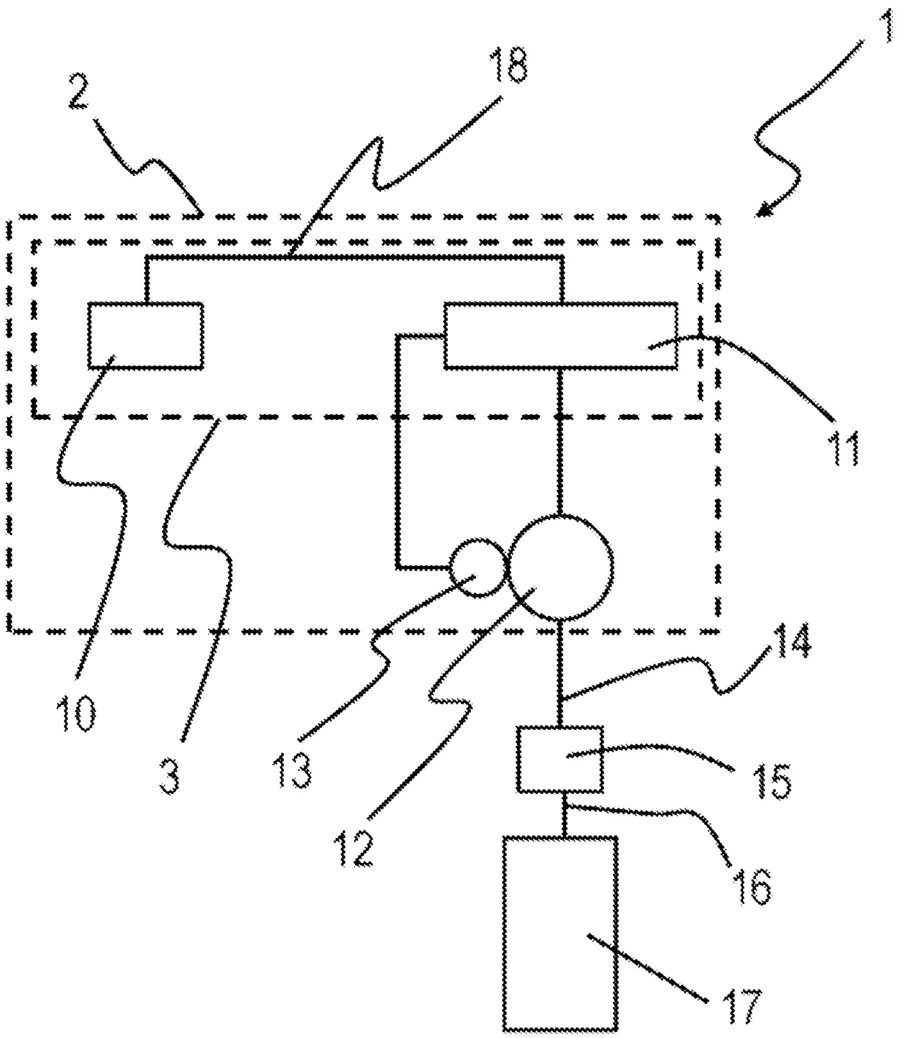
FIG. 1 a schematic representation of an exemplary embodiment of a switch assembly according to the improved concept.

Embodiments of the present invention provide an improved concept for driving a switch, in particular an on-load tap-changer, diverter switch, selector, double reversing change-over selector, reversing change-over selector, change-over selector, circuit breaker, on-load switch or disconnecting switch, by means of which concept the operational reliability is increased.

The improved concept is based, inter alia, on the idea of designing the drive system as a servo drive system and equipping it with a power section which, when a safety-relevant event occurs, initiates or carries out a safety measure, Safety measures are usually realized via separate safety modules arranged outside the power section, such as contactors with hard wiring.

According to an embodiment of the improved concept, a switch assembly comprising a switch and a servo drive system for the switch is described. The servo drive system has a motor for driving the switch, a power section for power supply of the motor, in particular open-loop- or closed-loop-controlled power supply, and a control unit for controlling the power section depending on at least one desired value. The control unit is configured to identify the presence of at least one safety-relevant event and, if the safety-relevant event occurs, to generate at least one control signal and to transmit it to the power section. The power section is configured to initiate or carry out at least one safety measure depending on the control signal.

A servo drive system is considered to be a drive system which controls the motor electronically, wherein the control may include a position control, an angle or position control, a speed or rotational speed control, an acceleration control and/or a torque control. The term "servo drive system" therefore implies that the drive system has a device for detecting one or more of the stated controlled variables and for feeding back a corresponding feedback signal to the control unit and the control on the basis of the feedback signal.

The control of the power section depending on the at least one desired value corresponds to a control in this sense.

By initiating a safety measure in the presence of a safety-relevant event, the operational safety of the switch assembly is increased.

According to at least one embodiment, the motor is coupled via one or more gear units to a shaft or another component of the switch in order to drive the switch.

According to at least one embodiment, the switch can be configured as an on-load tap-changer, or a diverter switch, or a selector, or a double reversing change-over selector, or a reversing change-over selector, or a change-over selector, or a circuit breaker, or an on-load switch or a disconnecting switch.

According to at least one embodiment, the power section is designed as a converter, in particular a servo converter, or as an equivalent electronic, in particular fully electronic, unit for drive machines.

According to at least one embodiment, the power section is configured to bring the motor to a stop, in particular to bring it to a stop safely, by a first of the at least one safety measures. The stopping can also include a movement within a defined tolerance range.

According to at least one embodiment, the safe stopping of the motor includes a safety function that corresponds to a stop category as defined in accordance with industry standard EN 60204-1:2006, the content of which is hereby incorporated by reference herein.

According to at least one embodiment, the safe stopping of the motor includes a safe-torque-off, STO, safety function, a safe-stop-1, SS1, safety function, a safe-stop-2, SS2, safety function, or a safe-operation-stop, SOS, safety function.

According to at least one embodiment, the safety measure includes monitoring a movement or a position of the motor, in particular a motor shaft of the motor.

According to at least one embodiment, monitoring the movement of the motor includes a safely-limited-speed, SLS, safety function, a safe-speed-monitor, SSM, safety function, a safe-speed-range, SSR, safety function, a safe-limit-position, SLP, safety function, a safe-position, SP, safety function, or a safe-direction, SDI, safety function.

According to at least one embodiment, the first safety measure includes an uncontrolled stopping of the motor.

According to at least one embodiment, the power section is configured to completely interrupt the power supply to the motor depending on the control signal. In particular, the first safety measure includes interrupting the power supply immediately or without delay. The power supply remains interrupted even when the motor is stopped, so that the motor can no longer provide torque (corresponds to STO).

According to at least one embodiment, the power section is configured to brake or stop the motor in a controlled manner depending on the control signal. The power supply to the motor is maintained during this time.

According to at least one embodiment, depending on the control signal, the power section is configured to completely interrupt the power supply to the motor after the controlled braking or stopping, so that the motor can no longer provide torque (corresponds to SS1).

According to at least one embodiment, depending on the control signal, the power section is configured to maintain the power supply to the motor after the controlled braking or stopping and to control a position of the motor, in particular of the motor shaft, to a desired position (corresponds to SS2).

According to at least one embodiment, in the event of a violation of a tolerance range with respect to the desired position, the power section is configured to initiate a further safety measure, in particular comprising an STO or an SS1 safety function.

According to at least one embodiment, the power section is configured to restrict a speed or rotational speed of the motor shaft by a second of the at least one safety measure.

According to at least one embodiment, the power section is configured to restrict the speed such that the speed is less than or equal to a predetermined maximum speed (corresponding to SLS or SSR).

According to at least one embodiment, the power section is configured to restrict the speed such that the speed is greater than or equal to a predetermined minimum speed (corresponding to SSM or SSR).

According to at least one embodiment, the power section is configured to initiate a further safety measure, in particular comprising an STO or an SS1 safety function, if the maximum speed is exceeded or the minimum speed is undershot.

According to at least one embodiment, the at least one safety-relevant event comprises a deviation of a direction of rotation of the motor, the motor shaft or a further shaft of the switch assembly from a predetermined desired direction of rotation (corresponds to SDI).

According to at least one embodiment, the direction of rotation is detected here by an encoder device.

According to at least one embodiment, the servo drive system comprises an absolute encoder, which is arranged on the servo drive system or the switch, in particular on-load tap-changer, diverter switch, selector, double reversing change-over selector, reversing change-over selector, change-over selector, circuit breaker, on-load switch or disconnecting switch, in order to detect an absolute position of the motor shaft or of the further shaft of the switch assembly. The control unit is configured to generate the control signal depending on a feedback signal of the absolute encoder.

According to at least one embodiment, the at least one safety-relevant event occurs when the absolute position of the motor shaft or the further shaft falls below a predetermined minimum position or exceeds a predetermined maximum position (corresponds to SLP).

According to an embodiment of the improved concept, a method for safely operating a switch assembly is also disclosed. According to the method, a power section of the switch assembly is actuated depending on at least one desired value. The presence of at least one safety-relevant event is identified and, in the case of the safety-relevant event, at least one control signal is transmitted to the power section. Depending on the control signal, at least one safety measure is initiated or carried out by the power section.

Further embodiments and implementations of the method are directly evident from the various embodiments of the switch assembly. In particular, individual components or a plurality of the components and/or assemblies described in relation to the switch assembly can be implemented to carry out the method accordingly.

In the following, the invention is explained in detail on the basis of exemplary embodiments with reference to the drawings. Components which are identical or functionally identical or which have an identical effect may be provided with identical reference signs. Identical components or components having an identical function may in some cases be explained only in relation to the figure in which they first appear. The explanation is not necessarily repeated in the subsequent figures.

FIG. 1 shows a schematic representation of an exemplary embodiment of a switch assembly 1 according to the improved concept with a switch 17 and a servo drive system 2, which is connected to the switch 17 via a drive shaft 16. The servo drive system 2 includes a motor 12, which can drive the drive shaft 16 via a motor shaft 14 and optionally via a gear unit 15. A control device 3 of the servo drive system 2 comprises a power section 11, which contains for example a servo converter, for the open-loop- or closed-loop-controlled power supply of the motor 12, and a control unit 10 for controlling the power section 11, for example via a bus 18.

The servo drive system 2 may have an encoder system 13, which serves as a feedback system or is part of the feedback system and is connected to the power section 11. Furthermore, the encoder system 13 is directly or indirectly coupled to the drive shaft 16.

The encoder system 13 is configured to detect a value for a position, in particular an angular position, for example an absolute angular position, of the drive shaft 16 and to generate a feedback signal based thereon. For this purpose, the encoder system 13 can comprise, for example, an absolute encoder, in particular a multi-turn absolute encoder, which is attached to the drive shaft 16, the motor shaft 14 or another shaft of which the position is unambiguously linked to the absolute position of the drive shaft 16. For example, the position of the drive shaft 16 can be unambiguously determined from the position of the motor shaft 14, for example via a transmission ratio of the gear unit 15. The control device 3, in particular the control unit 10 and/or the power section 11, is configured to control the motor 12 in open-loop or closed-loop fashion depending on the feedback signal.

The fastening of the absolute encoder is embodied, for example, as a combination of an interlocked connection with a frictionally engaged or integrally bonded connection.

The control unit 10 can identify the presence of a safety-relevant event, for example a malfunction or fault of the switch 17 or the drive system. If a safety-relevant event occurs, the control unit 10 transmits a control signal to the power section 11, which then initiates or executes a safety measure.

Figure 2:
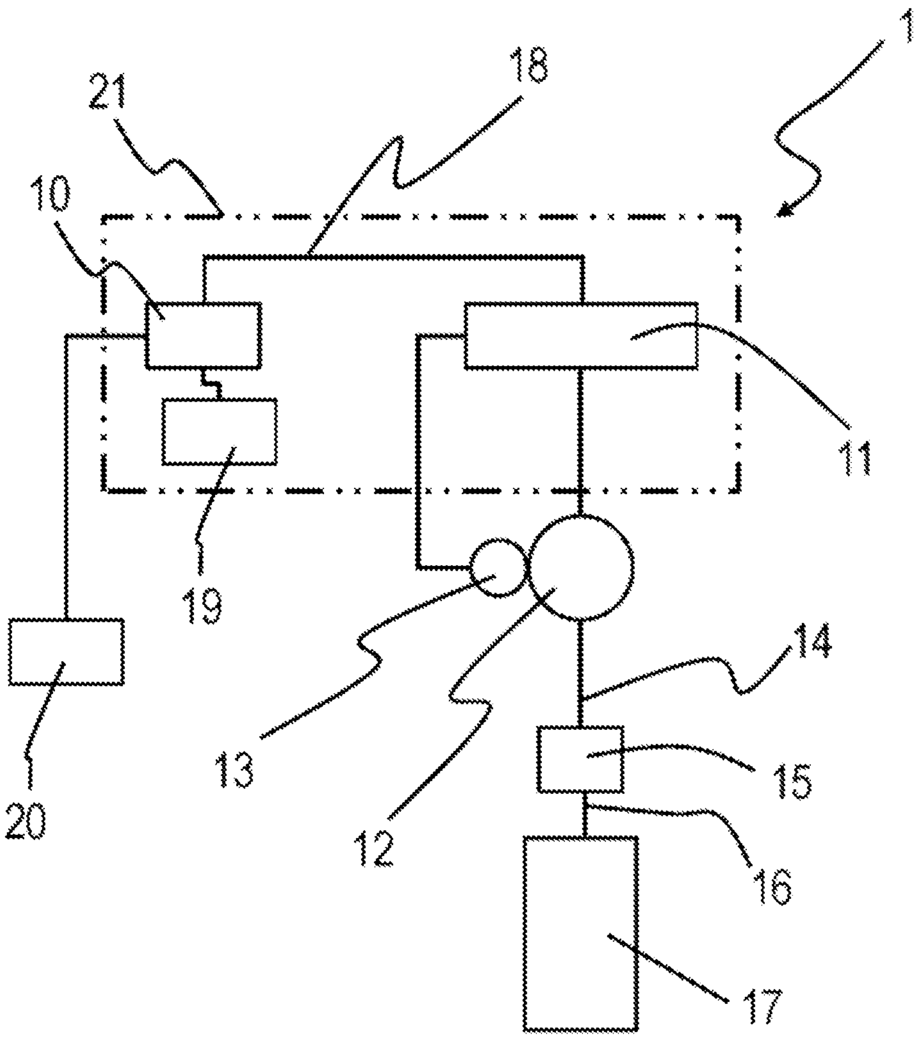
FIG. 2 a schematic representation of a further exemplary embodiment of a switch assembly according to the improved concept.

FIG. 2 shows a schematic representation of a further exemplary embodiment of a switch assembly 1 according to the improved concept, which is based on the embodiment according to FIG. 1.

The switch assembly 1 here optionally has a control cabinet 21, within which the control unit 10, the power section 11 and an optional man-machine interface 19 are arranged. The man-machine interface 19 is connected to the control unit 10 and can serve for control, maintenance or configuration purposes, for example.

The motor 12, the motor shaft 14 the encoder system 13 and/or the gear unit 15 can be located inside or outside the control cabinet 21.

The switch assembly 1, in particular the control unit 10, is coupled to a safety device 20, which comprises, for example, a circuit breaker, in order to disconnect the switch assembly or an item of electrical equipment to which the switch assembly is assigned from a power network, for example in the event of a fault or malfunction of the switch assembly.

A switch assembly according to the improved concept increases the operational safety of the servo drive system, the switch and the equipment. This is achieved in particular by the initiation of the safety measure by the power section.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Switch assembly
2 Servo drive system
3 Control device
10 Control unit
11 Power section
12 Motor
13 Encoder system
14 Motor shaft
15 Gear unit
16 Drive shaft
17 Switch
18 Bus
19 Man-machine interface
20 Safety device
21 Control cabinet

The invention claimed is:

1. A switch assembly, the switch assembly comprising:
a switch; and
a servo drive system for the switch, the servo drive system comprising:
a motor configured to drive the switch;
a power section configured to supply power to the motor; and
a control unit configured to control the power section depending on at least one desired value;
wherein the control unit is configured to identify the presence of at least one safety-relevant event and, in the case of the safety-relevant event, to transmit at least one control signal to the power section; and
wherein the power section is configured to initiate or carry out at least one safety measure depending on the control signal.

2. The switch assembly as claimed in claim 1, wherein the power section is configured to bring the motor to a stop by a first of the at least one safety measure.

3. The switch assembly as claimed in claim 2, wherein the first safety measure comprises an uncontrolled stopping of the motor.

4. The switch assembly as claimed in claim 2, wherein the power section is configured to fully interrupt the power supply to the motor depending on the control signal.

5. The switch assembly as claimed in claim 1, wherein the power section is configured to brake or stop the motor in a controlled manner depending on the control signal.

6. The switch assembly as claimed in claim 5, wherein the power section is configured to fully interrupt the power supply to the motor following the controlled braking or stopping.

7. The switch assembly as claimed in claim 5, wherein the power section is configured to maintain the power supply to the motor after the controlled braking or stopping depending on the control signal; and to control a position of the motor to a desired position.

8. The switch assembly as claimed in claim 1, wherein the power section is configured to restrict a speed of a motor shaft of the motor by a second of the at least one safety measure.

9. The switch assembly as claimed in claim 8, wherein the power section is configured to restrict the speed in such a way that the speed is less than or equal to a predetermined maximum speed.

10. The switch assembly as claimed in claim 8, wherein the power section is configured to restrict the speed in such a way that the speed is greater than or equal to a predetermined minimum speed.

11. The switch assembly as claimed in claim 1, wherein the at least one safety-relevant event comprises a deviation of a direction of rotation of the motor, of a motor shaft of the motor, or of a further shaft of the switch assembly from a predetermined desired direction of rotation.

12. The switch assembly as claimed in claim 1, wherein:

the servo drive system comprises an absolute encoder, which is arranged on the servo drive system or the switch, in order to detect an absolute position of a motor shaft of the motor or of a further shaft of the switch assembly; and the control unit is configured to generate the control signal depending on a feedback signal of the absolute encoder.

13. The switch assembly as claimed in claim 12, wherein the at least one safety-relevant event occurs when the absolute position of the motor shaft or of the further shaft falls below a predetermined minimum position or exceeds a predetermined maximum position.

14. The switch assembly as claimed in claim 1, wherein the switch is an on-load tap-changer or a diverter switch or a selector or a double reversing change-over selector or a reversing change-over selector or a change-over selector or a circuit breaker or an on-load switch or a disconnecting switch.

15. A method for safely operating a switch assembly, the method comprising:

controlling a power section of the switch assembly depending on at least one desired value;

identifying the presence of at least one safety-relevant event;

transmitting at least one control signal to the power section in the event of the safety-relevant event;

initiating or carrying out at least one safety measure by the power section depending on the control signal.

16. The switch assembly as claimed in claim 1, wherein the power section comprises a servo converter configured for open- or closed-loop controlled power supply of the motor.

* * * * *